(No Model.)
G. W. HARRINGTON.
MOLD FOR LINING ELBOW FITTINGS.
No. 536,204. Patented Mar. 26, 1895.
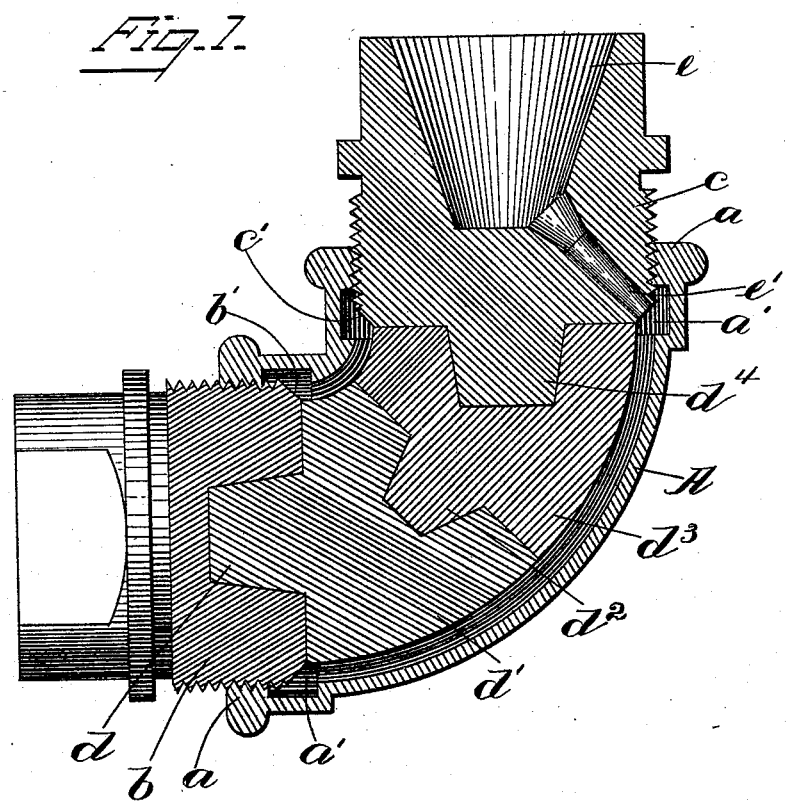

UNITED STATES PATENT OFFICE.

GEORGE W. HARRINGTON, OF WAKEFIELD, MASSACHUSETTS, ASSIGNOR TO THE NEW ENGLAND WATER PIPE COMPANY, OF SAME PLACE.

MOLD FOR LINING ELBOW-FITTINGS.

SPECIFICATION forming part of Letters Patent No. 536,204, dated March 26, 1895.

Application filed August 24, 1894. Serial No. 521,198. (No model.)

*To all whom it may concern:*

Be it known that I, GEORGE W. HARRINGTON, of Wakefield, in the county of Middlesex and State of Massachusetts, have invented an Improvement in Molds for Lining Elbow-Fittings, of which the following description, in connection with the accompanying drawing, is a specification, like letters on the drawing representing like parts.

This invention has for its object to construct a mold for casting or forming a lining, as for instance of lead, or composition containing lead, upon the interior of a pipe fitting, such as a curved or angular fitting, commonly called an elbow fitting.

In accordance with this invention the elbow fitting, of iron for instance, has formed at each end an inwardly extended screw threaded flange or rib, and preferably next to each flange an annular recess is formed, although the internal diameter of the fitting may be made the same from end to end if desired.

An externally screw threaded base plug is screwed into the lower end of the fitting, the screw threaded portion of which projects inwardly beyond the flange, or interiorly screw threaded portion of the fitting, and an externally screw threaded "pouring" plug is screwed into the upper end of the fitting, its screw threaded portion likewise projecting inwardly beyond the flange, or interiorly screw threaded portion of the fitting, and between said plugs a core is placed, made up of one or more pieces, two being herein shown, said core being made considerably smaller in diameter than the internal diameter of the fitting, so that a space is left entirely around it, and the pieces composing said core are made tapering to facilitate their withdrawal.

The pouring plug has a passage through it by which the molten material is conducted to the space around the cores, so that the metal poured into said pouring plug may enter and fill said space, and thereby interiorly line or coat the fitting. After the metal has been introduced the screw threaded plugs and cores are withdrawn, when it will be seen that the interior lining or coating has formed in it, at each end, screw threads, in continuation of the screw threaded portion of the fitting, so that when the fitting is joined to a pipe or to any other fitting, the entire interior of the tubular conductor thus formed will be lined. Each plug has also formed upon it a tapering end portion which enables the formation of a seat on the lining, against which the ends of an adjoining pipe may abut.

The drawing shows in vertical section an apparatus or mold for casting or forming linings on the interior of a curved or angular fitting.

The fitting shown at A is cast or otherwise formed usually of iron, and has at each end an inwardly extended flange or rib which is internally screw threaded, and next to each flange an annular recess $a'$ is formed made larger in diameter than the internal diameter of the fitting, yet said annular recesses may be omitted if desired, and the fitting thereby made of the same internal diameter between the flanges. A base plug $b$, externally screw threaded, is screwed into the lower end of the fitting, its inner end projecting beyond the flange $a$, and being tapered as at $b'$. A similar plug $c$ is screwed into the upper end of the fitting, its inner end projecting beyond the flange $a$ as shown, and having a tapered end portion $c'$.

The plug $b$ has a recess upon its inner side which receives the projection $d$ of a core piece $d'$, which is made curved and tapering, and said core piece $d'$ has a similar recess which receives a projection $d^2$, on a curved and tapering core piece $d^3$, said core piece $d^3$, having a recess which receives a projection $d^4$, upon the inner end of the plug $c$.

The core pieces $d'$ and $d^3$, taper or converge toward each other, in order that they may be withdrawn from opposite ends of the fitting.

The plug $c$ has a hole through it, shown as a central recess $e$, from the lower end of which leads diagonally a passage $e'$, designed to conduct the material to the annular space between the core and fitting.

The screw plug $b$ with one of the core pieces, as $d'$, is inserted at one end of the fitting, and thereafter the screw plug $c$ with its core piece $d^3$ is inserted at the opposite end of the fitting, and the molten metal is introduced through the passage in the pouring plug $c$, after which the parts are separated, and by reason of the inner ends of the plugs $b$, $c$, projecting beyond the flanges a, screw threads will be formed in the lining, which are continuations of the threads formed in said flanges, and by reason of the tapering ends b', c', of the plugs, seats are formed in the lining against which the ends of an adjoining pipe may be formed.

In case the seats are omitted then the internal diameter of the lining will be the same from end to end.

I claim—

1. An elbow pipe fitting having an internally screw threaded portion at each end, combined with an externally screw threaded base plug, screwed into one end, and an externally screw threaded pouring plug, having a passage through it, screwed into the other end, and a curved tapering core interposed between said plugs, made smaller in diameter than the internal diameter of the fitting, substantially as described.

2. An elbow pipe fitting having an inwardly extended flange at each end, combined with an externally screw threaded base plug screwed into one end, and an externally screw threaded pouring plug having a passage through it, screwed into the other end, the threaded portions of said plugs projecting inwardly beyond the flanges, and two core pieces, in line with each other, interposed between said plugs, made smaller in diameter than the internal diameter of the fitting, substantially as described.

3. An elbow pipe fitting having an inwardly extended flange at each end, combined with an externally screw threaded base plug screwed into one end, and an externally screw threaded pouring plug, having a passage through it, screwed into the other end, the threaded portions of said plugs projecting inwardly beyond the flanges, and two curved core pieces in line with each other interposed between and abutting against said plugs, made smaller in diameter than the internal diameter of the fitting, substantially as described.

4. An elbow pipe fitting having an inwardly extended flange at each end, combined with an externally screw threaded base plug screwed into one end, and an externally screw threaded pouring plug, having a passage through it, screwed into the other end, the threaded portions of said plugs projecting inwardly beyond the flanges, and two curved tapered core pieces abutting against each other endwise, interposed between said plugs, being smaller in diameter than the internal diameter of the fitting, substantially as described.

5. An elbow pipe fitting having inwardly extended screw threaded flanges at each end, and an annular recess next each flange, larger in diameter than the internal diameter of the fitting, combined with an externally screw threaded base plug, screwed into one end, and an externally screw threaded pouring plug, with a passage through it, screwed into the other end, the threaded portions of said plugs projecting inwardly beyond the flanges, and a curved core interposed between said plugs, made smaller in diameter than the internal diameter of the fitting, substantially as described.

6. An elbow pipe fitting having an inwardly extended screw threaded flange at each end, combined with an externally screw threaded base plug screwed into one end, and an externally screw threaded pouring plug having a passage through it screwed into the other end, the threaded portions of said plugs projecting inwardly beyond the flanges, and a curved core of smaller diameter than the internal diameter of the fitting interposed between said plugs, thereby presenting a mold into which the metal is poured to form a lining for the fitting with screw threaded portions in continuation of the screw threads of the flanges thereof, substantially as described.

7. An elbow pipe fitting having an inwardly extended screw threaded flange at each end, combined with an externally screw threaded base plug with a tapered end, screwed into one end, and an externally screw threaded pouring plug having a passage through it and a tapered end screwed into the other end, the threaded portions of said plugs projecting inwardly beyond the flanges, and a curved core of smaller diameter than the internal diameter of the fitting, interposed between said plugs, thereby presenting a mold into which the metal is poured to form a lining for the fitting with screw threaded portions in continuation of the screw threads of the flanges thereof, substantially as described.

In testimony whereof I have signed my name to this specification in the presence of two subscribing witnesses.

GEORGE W. HARRINGTON.

Witnesses:
EDW. C. STORROW,
B. J. NOYES.